United States Patent
Furlong et al.

(10) Patent No.: US 9,767,337 B2
(45) Date of Patent: Sep. 19, 2017

(54) INDICIA READER SAFETY

(71) Applicant: Hand Held Products, Inc., Fort Mill, SC (US)

(72) Inventors: John A. Furlong, Woodbury, NJ (US); Sean Philip Kearney, Marlton, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/262,365

(22) Filed: Sep. 12, 2016

(65) Prior Publication Data

US 2017/0091502 A1   Mar. 30, 2017

Related U.S. Application Data

(60) Provisional application No. 62/234,985, filed on Sep. 30, 2015.

(51) Int. Cl.
*G06K 7/12* (2006.01)
*G06K 7/14* (2006.01)
(Continued)

(52) U.S. Cl.
CPC ........ *G06K 7/12* (2013.01); *G06K 7/10821* (2013.01); *G06K 7/10831* (2013.01);
(Continued)

(58) Field of Classification Search
CPC .... G06K 7/12; G06K 7/1413; G06K 7/10821; G06K 7/10831; G06K 7/1434; G06K 19/0614; G06K 19/06046
See application file for complete search history.

(56) References Cited

U.S. PATENT DOCUMENTS 5,525,798 A * 6/1996 Berson ............... G06K 7/12
                                                  235/468
6,006,991 A * 12/1999 Faklis ............... G06K 7/12
                                                  235/462.06

(Continued)

FOREIGN PATENT DOCUMENTS

JP   2010-146461 A    7/2010
WO   2013163789 A1   11/2013
(Continued)

OTHER PUBLICATIONS

U.S. Appl. No. 13/367,978, filed Feb. 7, 2012, (Feng et al.); now abandoned.

(Continued)

*Primary Examiner* — Daniel Walsh
(74) *Attorney, Agent, or Firm* — Additon, Higgins & Pendleton, P.A.

(57) ABSTRACT

Indicia readers may be configured with two illumination light sources: a primary light source for illuminating primary indicia (e.g., a barcode) and a secondary ultraviolet (UV) light source for revealing secondary indicia (e.g., UV fluorescent watermarks) that are used to protect against counterfeit and fraud. Ultraviolet light can be harmful. The present invention embraces methods and a device for controlling the secondary UV light source to limit UV exposure. When an exposure risks is detected, the UV light source is deactivated.

20 Claims, 3 Drawing Sheets

(51) Int. Cl.
   *G06K 7/10* (2006.01)
   *G06K 19/06* (2006.01)
(52) U.S. Cl.
   CPC ......... *G06K 7/1413* (2013.01); *G06K 7/1434*
   (2013.01); *G06K 19/0614* (2013.01); *G06K 19/06046* (2013.01)

(56) References Cited

U.S. PATENT DOCUMENTS

| | | | |
|---|---|---|---|
| 6,203,069 B1 * | 3/2001 | Outwater | G09F 3/0294 283/81 |
| 6,612,494 B1 * | 9/2003 | Outwater | B41M 3/14 235/462.01 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |

(56) References Cited

U.S. PATENT DOCUMENTS

| | | |
|---|---|---|
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2003/0169415 A1* | 9/2003 | Premjeyanth ........ G06K 9/2018 356/71 |
| 2005/0060919 A1* | 3/2005 | Yu ........................ B42D 15/022 40/124.02 |
| 2005/0248088 A1* | 11/2005 | Yoshida .................... G06K 7/10 273/149 R |
| 2006/0086803 A1* | 4/2006 | Berson ..................... G06K 7/12 235/491 |
| 2007/0063048 A1 | 3/2007 | Havens et al. |
| 2007/0143232 A1* | 6/2007 | Auslander ................ G06K 7/12 705/408 |
| 2007/0170265 A1* | 7/2007 | Sinclair ................ G06K 19/086 235/491 |
| 2008/0035866 A1* | 2/2008 | Goodwin ................... B07C 3/14 250/505.1 |
| 2008/0297767 A1* | 12/2008 | Goren ................ G06K 7/10732 356/51 |
| 2009/0134221 A1 | 5/2009 | Zhu et al. |
| 2009/0134227 A1* | 5/2009 | Roth ........................ G06K 19/14 235/491 |
| 2009/0188970 A1* | 7/2009 | Gouelibo ............. G06K 19/086 235/375 |
| 2009/0286597 A1* | 11/2009 | Shigeta ..................... A63F 1/14 463/29 |
| 2010/0012728 A1* | 1/2010 | Rosset ..................... G06K 7/12 235/462.05 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0327060 A1* | 12/2010 | Moran ................. G06K 7/0004 235/440 |
| 2011/0001812 A1* | 1/2011 | Kang ..................... G08B 13/00 348/77 |
| 2011/0169999 A1 | 7/2011 | Grunow et al. |
| 2011/0202554 A1 | 8/2011 | Powilleit et al. |
| 2012/0000981 A1* | 1/2012 | Meier ................ G06K 7/10574 235/454 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0235785 A1* | 9/2012 | Alberth ................ G07D 7/0046 340/5.8 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |

(56) References Cited

U.S. PATENT DOCUMENTS

| | | |
|---|---|---|
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0320094 A1* | 12/2013 | Slusar .................. G06F 3/0346 235/487 |
| 2013/0341402 A1* | 12/2013 | Itakura ............... G06K 19/0614 235/462.41 |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084069 A1* | 3/2014 | Mizukoshi ............... G06K 7/12 235/468 |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |

(56) References Cited

U.S. PATENT DOCUMENTS

| | | |
|---|---|---|
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0078028 A1* | 3/2016 | Pawlik ............... H04N 5/2256 382/209 |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0163142 A1* | 6/2016 | Auger ............... G07D 7/20 235/375 |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0247008 A1* | 8/2016 | Lewis ............... G06K 7/10732 |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

Combined Search and Examination Report in counterpart GB Application No. 1615961.8 dated Mar. 8, 2017, pp. 1-6 [US. Pub. Nos. 2008/0297767 and 2003/0169415 previously cited].

* cited by examiner

INDICIA READER SAFETY

CROSS-REFERENCE TO RELATED APPLICATION

The present application claims the benefit of U.S. Patent Application No. 62/234,985 for Indicia Reader Safety filed Sep. 30, 2015, which is hereby incorporated by reference in its entirety.

FIELD OF THE INVENTION

The present invention relates to indicia readers and more specifically, to imaging scanners configured with an ultra-violet (UV) light source and a mechanism for limiting UV exposure.

BACKGROUND

Point of sale systems are used at checkout to tally items for payment, process the payment, and update the store's inventory. These systems have computing capabilities and often use multiple data collection devices.

One data collection device is the indicia reader (i.e., barcode scanner). Indicia readers are available in multiple varieties, and are commonly found at a retail store's point of sale (i.e., checkout). These readers can conveniently scan a variety of indicia types (e.g., barcodes) to obtain product information for use during the checkout process.

Besides barcodes, other information is often required at checkout. Sometimes, items require a customer to present some information for legal or security reasons. For example, a customer may be required to present proof of age/identity (e.g., a driver's license) to purchase alcohol or verify a credit card's ownership.

Unfortunately, sometimes the items presented at checkout may not be valid or authentic. Extra scrutiny and record keeping is increasingly required to prevent loss and/or liability. Failing to detect invalid or counterfeit items and/or create a record of verification could result in fines or loss.

Invisible security marks may be used for item verification. These security marks may be printed or affixed to items and may be detected and/or decoded by using some specialized process/device. For example, security marks may be printed using invisible ink that fluoresces visibly when illuminated with ultraviolet light.

Many of these extra processes take extra time and utilize special equipment. The extra time required for checkout may annoy both the customer and the merchant, and the special equipment may require extra space at checkout, which is not always available. What is more, overt security processes may bother some customers and may help violators understand and work around these processes.

As a result, indicia readers that can read indicia (e.g., barcodes) and record, authenticate, validate, and/or verify items at checkout have been suggested (e.g., U.S. patent application Ser. No. 14/662,922 for a "MULTIFUNCTION POINT OF SALE SYSTEM" which is hereby incorporated by reference in its entirety).

These indicia readers utilize a UV light source to illuminate invisible security marks as part of a security process. In some possible embodiments, the indicia reader's UV source may be used inappropriately (e.g., pointed at a human, not deactivated after use, etc.). In these cases, the UV illumination may result in damage and/or harm. As a result, there exists a need for indicia readers having a UV light source also to have an automatic safety feature to limit UV exposure.

SUMMARY

Accordingly, in one aspect, the present invention embraces a computer-implemented method for controlling an indicia reader's illumination. The method includes the step of activating a primary light source to illuminate a primary indicia on an item. The item's primary indicia is then scanned to produce primary indicia information. The item is then classified based on the primary-indicia information, and the item's class is compared to classes stored in a memory. If the item's class matches one or more classes stored in the memory, then a secondary, ultra-violet (UV) light source is activated to illuminate a secondary indicia. The secondary UV light source is deactivated if an exposure risk to the secondary UV light source is detected or if the secondary indicia is scanned to produce secondary-indicia information.

In an exemplary embodiment of the computer-implemented method, the exposure risk includes the expiration of a time-period.

In another exemplary embodiment of the computer-implemented method, the exposure risk includes the detection of a particular object in the indicia reader's field of view. In a possible embodiment, this particular object is a human or human body part, such as an eye.

In another exemplary embodiment of the computer-implemented method, the exposure risk includes the detection of a particular substance in the indicia reader's field of view.

In another exemplary embodiment of the computer-implemented method, the exposure risk includes a particular behavior in the indicia reader's field of view. In a possible embodiment, this particular behavior includes the item leaving the indicia reader's field of view.

In another exemplary embodiment of the computer-implemented method, the indicia reader is a hand-held or fixed-mount imaging scanner.

In another exemplary embodiment of the computer-implemented method, the item is an identification document.

In another exemplary embodiment of the computer-implemented method, the secondary indicia is a security mark to prove the item's authenticity.

In another exemplary embodiment of the computer-implemented method, the secondary indicia is visible when illuminated by the secondary UV light source but is otherwise invisible.

In another exemplary embodiment of the computer-implemented method, the primary light source is a visible light source and the primary indicia is visible under normal lighting conditions.

In another exemplary embodiment of the computer-implemented method, the primary indicia is a barcode.

In another aspect, the present invention embraces a computer-implemented method for limiting UV light exposure from an indicia reader configured to read UV sensitive security marks. The method includes the step of determining that an item has one or more UV-sensitive security marks. A UV light source is then activated to read the UV-sensitive security marks. If a UV exposure risk is detected, then deactivating the UV light source.

In an exemplary embodiment of the computer-implemented method for limiting UV light exposure from an indicia reader configured to read UV sensitive security marks, the exposure risk includes potential UV exposure of a human body par or an object/substance that is adversely affected by UV light.

In another exemplary embodiment of the computer-implemented method for limiting UV light exposure from an indicia reader configured to read UV sensitive security marks, the UV exposure risk includes detecting that the item is no longer visible in the indicia reader's field of view.

In another exemplary embodiment of the computer-implemented method for limiting UV light exposure from an indicia reader configured to read UV sensitive security marks, the method includes two additional steps after the UV light source has been activated. The first additional step is scanning at least one UV-sensitive security mark, and the second additional step is recording the at least one UV-sensitive security mark for further processing.

In another exemplary embodiment of the computer-implemented method for limiting UV light exposure from an indicia reader configured to read UV sensitive security marks, the method includes two additional steps after the UV light source has been activated. The first additional step is scanning at least one UV-sensitive security mark, and the second additional step is recording the at least one UV-sensitive security mark for further processing. Here an exposure risk includes the expiration of a time-period in which no security marks have been scanned and recorded.

In another aspect, the present invention embraces an imaging indicia scanner. The indicia scanner includes a camera for capturing images of a field of view. The indicia scanner includes a primary illumination subsystem for illuminated the field of view to enable primary indicia scanning. The indicia scanner also includes a secondary UV illumination subsystem for illuminating the field of view to enable UV-sensitive indicia scanning. A memory for storing software and a database is included, wherein the database includes information corresponding to items that require UV-sensitive indicia scanning. A processor is included as well. The processor is communicatively coupled to the camera, the primary illumination subsystem, the secondary UV illumination subsystem, and the memory. The processor is configured by software to perform a method. The method includes activating the primary illumination subsystem and the camera when triggered by a user. The primary indicia is then scanned to produce primary indicia information. This primary indicia information is compared to the database and if the primary indicia information matches at least a portion of the database, then the secondary UV illumination subsystem is activated. The secondary UV illumination subsystem is deactivated if (i) the UV-sensitive indicia have been scanned, (ii) an exposure risk has been detected, or (iii) a time period, in which no UV-sensitive indicia have been scanned and no exposure risks have been detected, has expired.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a method and device for limiting exposure from the UV radiation emitted from an indicia reader that is configured to read UV sensitive marks on items.

Indicia (e.g., 1D-barcodes, QR codes, Aztec Codes, Data Matrix, text, etc.) may be affixed, printed, or otherwise attached to items to provide information regarding the item in a machine-readable format.

Indicia readers are devices for reading (i.e., scanning) indicia. Imaging indicia readers (i.e., imaging scanners, area-image scanners, imaging readers, etc.) may be handheld (e.g., HONEYWELL™ XENON™ 1900) or fixed mount (e.g. in-counter scanners).

To obtain the information encoded in an indicia, a user triggers an indicia reader (e.g., by pulling a trigger, by pointing an indicia reader in streaming mode at an indicia, etc.) to capture digital images of an indicium (i.e., an indicia). In some embodiments, the indicia reader may illuminate its field of view with a visible (i.e., white light) source during image capture, especially in low lighting conditions. Illuminating the items during imaging helps insure that the captured digital images suitable for processing.

After capture, the digital images are processed using algorithms running on a processor. The processor is either part of the indicia reader or part of a host device communicatively coupled to the indicia reader. At a minimum, the processor recognizes the indicia within the image and decodes the indicia according to the indicia's type (e.g., QR code, OCR, etc.).

Often items are marked with various indicia. In some cases, items include a primary indicia to provide certain information regarding the item and secondary indicia that helps verify/authenticate the item or the person bearing the item. These security marks may be invisible to a user without the use of some special illumination (e.g., ultraviolet illumination).

A UV light source may cause secondary indicia (i.e., security marks) created from UV sensitive materials (e.g., fluorescent dyes) to fluoresce visibly when exposed to UV light. For example, UV sensitive security marks may be included on currency, driver's licenses, passports, and postage stamps to prevent counterfeiting. Documents may also include UV sensitive security marks to prevent forgery.

The UV light source emits UV radiation (i.e., light) in a range of wavelengths about 100 nanometers (nm) to 400 nm at an intensity suitable for viewing a security mark. UV light sources may be special equipment dedicated to this purpose that are installed where security is necessary (e.g., a point of sale, a travel checkpoint, etc.). This special, single-purposed equipment is not ideal in some locations. For example, point-of-sale (i.e., checkout) locations may have little space for additional equipment. In addition, this equipment is not well suited for mobile applications (e.g., logistics, shipping, etc.). Indicia readers (e.g., handheld indicia readers) configured to read both primary indicia and secondary indicia address these limitations.

Figure 1:
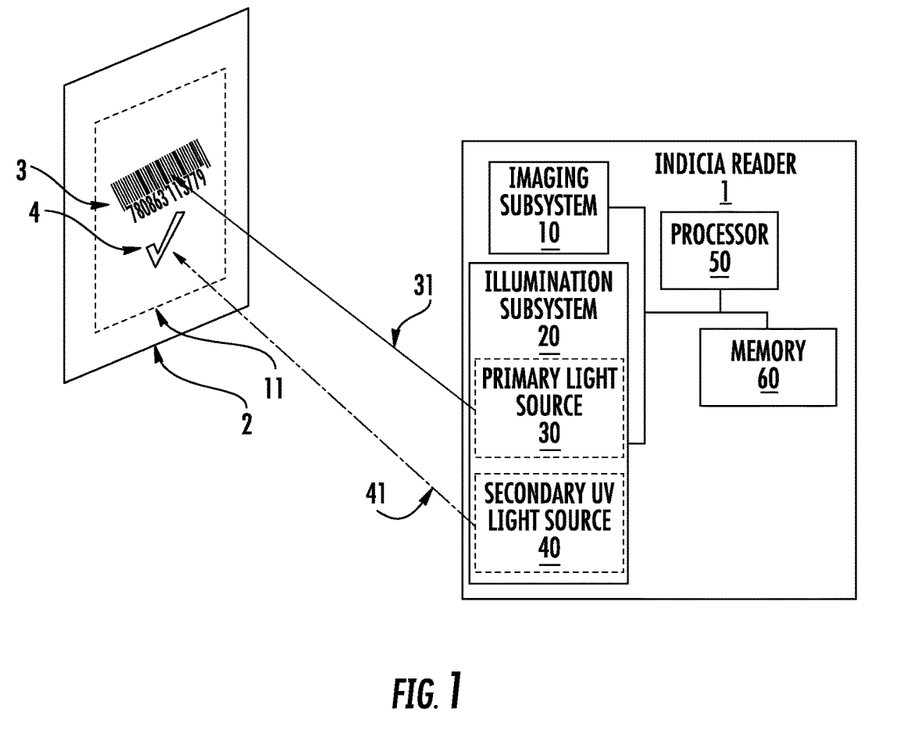
FIG. 1 schematically depicts an indicia reader and its typical environment according to an embodiment of the present invention.

FIG. 1 schematically depicts an indicia reader for reading primary indicia (e.g., barcodes) and secondary indicia (e.g., UV sensitive security marks). The indicia reader 1 includes an illumination subsystem 20 for highlighting an item 2 for imaging, an imaging subsystem 10 for capturing digital images the item within a field of view 11, a processor 50 for controlling the indicia reader subsystems and for processing the captured images, and a computer readable memory 60 for storing information.

The illumination subsystem 20 includes a primary light source 30 that emits visible radiation 31 (e.g., light in the wavelength range of 400 nm-700 nm) when the indicia reader 1 is triggered (e.g., by pressing a trigger switch) to scan (i.e., read) a primary indicia 3. An exemplary primary light source may include one or more light emitting elements (e.g., light emitting diodes, laser diodes, etc.) directed and aligned with the field of view of the indicia reader's imaging subsystem 11.

The illumination subsystem 20 also includes a secondary UV light source 40 for illuminating UV sensitive indicia 4 with UV light 41. The UV light source 40 may include one or more UV light emitting diodes. The UV light source 40 is activated in one of a variety of ways. A user may activate the UV light source 40 manually (e.g., one or more pulls of a trigger). Alternatively, the UV light source 40 may be activated in response to particular information from a scanned barcode. For example, an item's barcode may have encoded information that indicates that this item is part a particular class of items (e.g., passports) that have secondary indicia. After scanning the primary indicia, the indicia reader may compare the class of the scanned item with classes stored in a computer readable memory. A match may trigger the scanner to activate the secondary UV light source. Deactivation of the secondary UV light source may be accomplished manually by a user (e.g., releasing a trigger), or automatically (e.g., after a secondary indicia is scanned and recorded).

The imaging subsystem 10 is designed to capture a digital image of a field of view 11 aligned with the illumination subsystem 20. To achieve this imaging, the imaging subsystem 10 may include an imaging lens or lenses to form a real image onto a sensor array. Optical filters may also be included to help remove stray light and/or enhance the visibility of a security mark. The sensor may be a color or monochromatic sensor. The sensor may use charge coupled device (CCD) or complementary metal oxide semiconductor (CMOS) technology. For example, a sensor used for indicia reading may be a silicon CCD array, which is sensitive to visible wavelengths.

The processor 50 controls the indicia reader subsystems and processes the captured images. Exemplary processor types include one or more controllers, a digital signal processor (DSP), an image signal processor, an application specific integrated circuit (ASIC), a programmable gate array (PGA), and/or programmable logic controller (PLC). The processor detects and decodes indicia (e.g., one-dimensional (1D) barcodes, two-dimensional (2D) barcodes, color barcodes, etc.). The processor controls the subsystems and processes primary and secondary indicia.

The computer readable memory 60 stores information. Exemplary memory types for use in the indicia reader 1 include read only memory (ROM), flash memory, and/or a hard-drive. The memory stores the necessary software, reference libraries, databases, item classes, and results for primary and secondary indicia reading and verification.

Figure 2A:
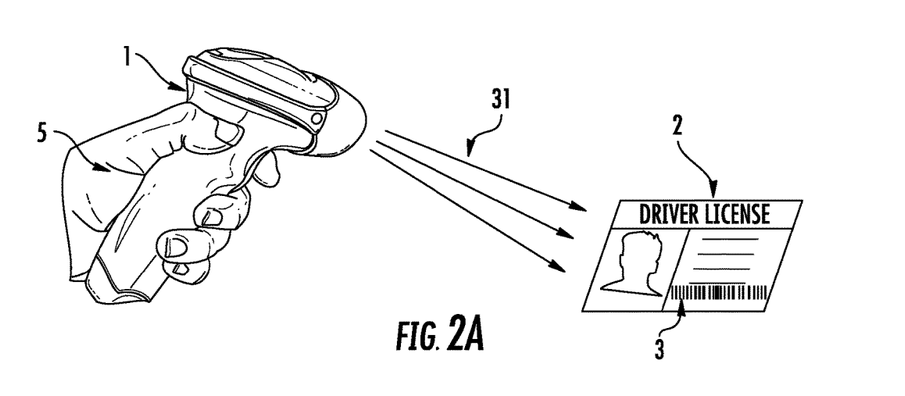
FIG. 2a graphically depicts an indicia reader illuminating an object with a primary light source for indicia reading according to an embodiment of the present invention.
Figure 2B:
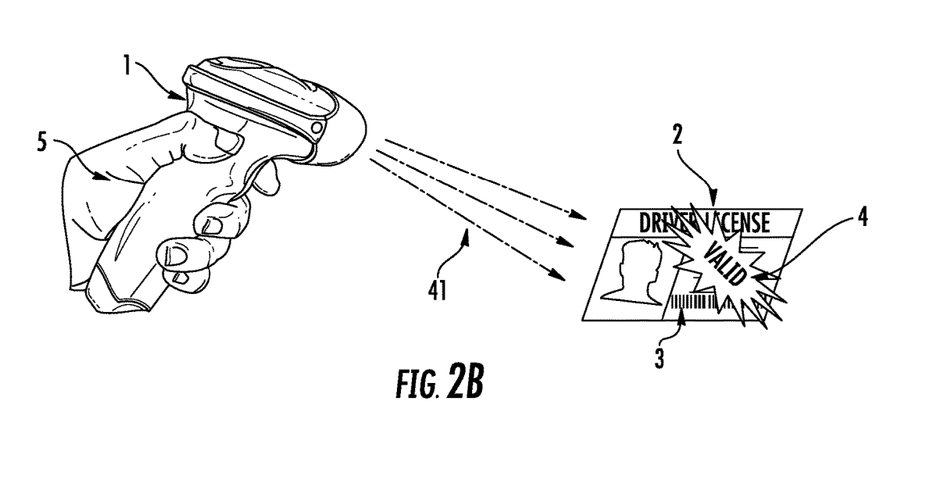
FIG. 2b graphically depicts an indicia reader illuminating an object with a secondary UV light source for security mark reading according to an embodiment of the present invention.

FIG. 2a and FIG. 2b graphically depict the use of an indicia reader configured with a primary light source and a secondary UV light source. FIG. 2a illustrates the indicia reader illuminating the driver's license with a primary light source so that the driver's license barcode may be scanned. FIG. 2b illustrates the indicia reader illuminating the driver's license with a secondary UV light source so that the security mark may be viewed and/or recorded with the imaging subsystem of the indicia reader.

There exists the potential for intentional or unintentional misuse of indicia readers configured with UV light sources. Misuse is a safety concern. UV radiation may be harmful to certain materials. For example, UV radiation may cause degradation (e.g., photo-oxidation). UV radiation may also be harmful to humans. For example, a human's skin and eyes are sensitive to damage (e.g., sunburn, skin cancer, photokeratitis, etc.) caused by UV radiation. Further, some skin conditions (e.g., rosacea) and diseases (e.g., lupus) may be aggravated by UV exposure.

Misuse can occur in a variety of ways. For example, the secondary UV light may be activated by a user (or automatically in response to a scan) but not deactivated before it the indicia reader is pointed away from the initial target and towards a human (e.g., the user's eye). In another example, the secondary UV light may be automatically in response to a barcode scan but not deactivated before it the indicia reader is pointed away from the initial target and towards a human (e.g., the user's eye). The misuse of the UV light source may present an exposure risk.

Exposure risks can be recognized by sensing certain characteristics or behaviors while the secondary UV light source is active. For example, the UV light remaining on for a time-period longer than a time limit may be recognized as an exposure risk. In another example, an object or human entering the imaging subsystem's field of view may be recognized as an exposure risk. In another example, a particular behavior, such as the item being removed from the field of view, may be recognized as an exposure risk. In another example, recognizing a particular substance that is adversely affected by UV light in the field of view may be recognized as an exposure risk. In still another example, recognizing that the primary indicia is not visible may be recognized as an exposure risk.

Figure 3A:
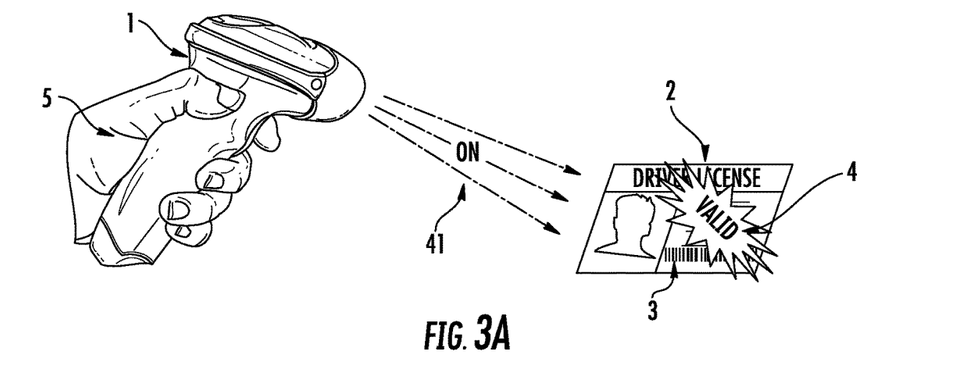
FIG. 3a graphically depicts an indicia reader with an activated secondary UV light source according to an embodiment of the present invention.
Figure 3B:
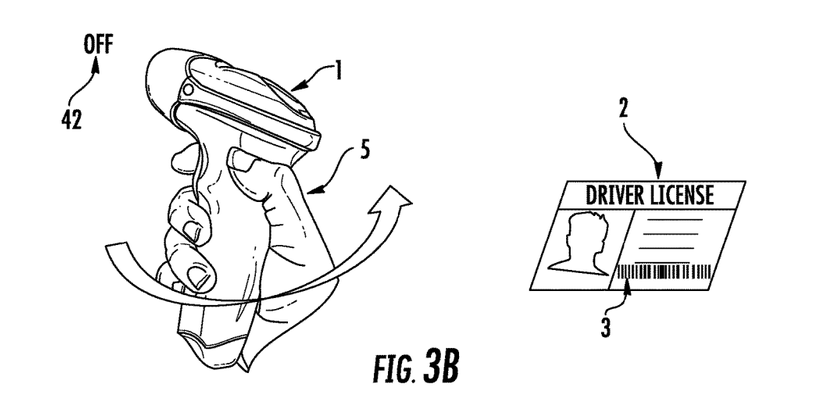
FIG. 3b graphically depicts an indicia reader with a deactivated secondary UV light source, which results from the detection of an exposure risk, according to an embodiment of the present invention.

An exemplary embodiment of an indicia reader's use and misuse is shown if FIGS. 3A and 3B. FIG. 3A shows the indicia reader 1 scanning a UV sensitive indicia 4 on a driver's license. The secondary UV light source is ON and radiating UV light 41 towards the item 2 to make the security mark 4 visible. FIG. 3B show that during this operation a user 5 rotates the indicia reader 1 away from the item 2. This action is detected as an exposure risk and UV light source 40 is turned OFF 42 (i.e., deactivated) as a result.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;

U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;

U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;

U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

To supplement the present disclosure, this application incorporates entirely by reference the following provisional patent applications:

U.S. Patent Application No. 61/632,425 for Laser Scanning Code Symbol Reading System Employing Multi-Channel Scan Data Signal Processing With Synchronized Digital Gain Control (Tao et al.) For Full Range Scanning filed May 18, 2012 (Xian et al.);

U.S. Patent Application No. 61/632,426 for a Laser Scanning Code Symbol Reading System Providing Improved Control Over The Length And Intensity Characteristics Of A Laser Scan Line Projected Therefrom Using Laser Source Blanking Control filed May 21, 2012 (Brady et al.);

U.S. Patent Application No. 61/714,394 for an Integrated Dimensioning and Weighing System filed Oct. 16, 2012 (McCloskey et al.);

U.S. Patent Application No. 61/714,415 for a Replaceable Connector filed Oct. 16, 2012 (Skvoretz);

U.S. Patent Application No. 61/715,990 for a Vehicle Computer System with Transparent Display filed Oct. 19, 2012 (Fitch et al.);

U.S. Patent Application No. 61/733,007 for a Mobile Device Having Object-Identification Interface filed Dec. 4, 2012 (Samek et al.);

U.S. Patent Application No. 61/740,964 for a Barcode Scanner with Integrated Surface Authentication filed Dec. 21, 2012 (Havens et al.);

U.S. Patent Application No. 61/741,780 for a Laser Scanning Code Symbol Reading System Employing Programmable Decode Time-Window Filtering filed May 25, 2012 (Wilz et al.);

U.S. Patent Application No. 61/751,411 for a System for Managing Scanner Devices filed Jan. 11, 2013 (Crimm et al.);

U.S. Patent Application No. 61/752,088 for a Laser Scanning Module Employing a Laser Scanning Assembly Having Elastomeric Wheel Hinges filed Jan. 14, 2013 (Havens et al);

U.S. Patent Application No. 61/787,414 for an Integrated Dimensioning and Weighing System filed Mar. 15, 2013 (McCloskey et al.);

U.S. Patent Application No. 61/807,825 for a Wearable Barcode Scanner filed Apr. 3, 2013 (Wang);

U.S. Patent Application No. 61/833,517 for an Integrated Dimensioning and Weighing System filed Jun. 11, 2013 (McCloskey et al.);

U.S. Patent Application No. 61/841,717 for a Dimensioning System filed Jul. 1, 2013 (Fletcher);

U.S. Patent Application No. 61/872,299 for a System and Method for Package Dimensioning, filed Aug. 30, 2013 (Lloyd et al.);

U.S. Patent Application No. 61/906,282 for a Voice-Based Health Monitor, such as a Vocal Energy Level Monitor that Compares a Subject's Energy Levels to a Baseline Energy Level, filed Nov. 19, 2013 (Kumar);

U.S. Patent Application No. 61/931,260 for a Shelving and Package Locating Systems for Delivery Vehicles, filed Jan. 24, 2014 (Payne);

U.S. Patent Application No. 61/975,241 for a Indicia Reader Having Authentication Capabilities, filed Apr. 4, 2014 (Van Horn et al.);

U.S. Patent Application No. 62/043,728 for GESTURE-CONTROLLED COMPUTER SYSTEM filed Aug. 29, 2014 (Bouchat et al.);

U.S. Patent Application No. 62/056,327 for SYSTEM AND METHOD FOR WORKFLOW MANAGEMENT filed Sep. 26, 2014 (Geisler et al.);

U.S. Patent Application No. 62/062,175 for SYSTEM AND METHODS FOR DIMENSIONING filed Oct. 10, 2014 (McCloskey et al.);

U.S. Patent Application No. 62/083,566 for GESTURE-CONTROLLED COMPUTER SYSTEM filed Nov. 24, 2014 (Bouchat et al.);

U.S. Patent Application No. 62/092,141 for INFORMATION AUGMENTED PRODUCT GUIDE filed Dec. 15, 2014 (Todeschini et al.);

U.S. Patent Application No. 62/092,147 for AUGMENTED REALITY VIRTUAL PRODUCT FOR DISPLAY filed Dec. 15, 2014 (Todeschini);

U.S. Patent Application No. 62/092,156 for AUGMENTED REALITY ASSET LOCATOR filed Dec. 15, 2014 (Todeschini et al.);

U.S. Patent Application No. 62/093,448 for LOCATION BASED FORKLIFT COLLISION WARNING, PREDICTION AND AVOIDANCE filed Dec. 18, 2014 (Bernhardt et al.);

U.S. Patent Application No. 62/093,501 for ACTIVE EXIT SIGN filed Dec. 18, 2014 (McMahan et al.);

U.S. Patent Application No. 62/093,535 for FLIP OPEN WEARABLE COMPUTER filed Dec. 18, 2014 (Harr);

U.S. Patent Application No. 62/093,806 for METHOD OF IDENTIFYING A BAD BATTERY IN AN ELECTRONIC DEVICE filed Dec. 18, 2014 (Young et al.);

U.S. Patent Application No. 62/093,859 for METHOD TO IDENTIFY BAD TOUCH PANEL WITH INTERMITTENT FIELD FAILURES filed Dec. 18, 2014 (Young et al.);

U.S. Patent Application No. 62/094,344 for HOST CONTROLLABLE POP-UP SOFT KEYPADS filed Dec. 19, 2014 (Roeder);

U.S. Patent Application No. 62/094,442 for INTELLIGENT SMALL SCREEN LAYOUT AND POP-UP KEYPADS FOR SCREEN-ONLY DEVICES filed Dec. 19, 2014 (Roeder);

U.S. Patent Application No. 62/095,089 for CONFORMABLE HAND MOUNT FOR A MOBILE SCANNER filed Dec. 22, 2014 (Oberpriller et al.);

U.S. Patent Application No. 62/095,453 for AUGMENTED DISPLAY AND USER INPUT SYSTEM filed Dec. 22, 2014 (Todeschini);

U.S. Patent Application No. 62/095,470 for DELAYED TRIM OF MANAGED NAND FLASH MEMORY IN COMPUTING DEVICES filed Dec. 22, 2014 (Redondo et al.);

U.S. Patent Application No. 62/095,808 for METHOD OF BARCODE TEMPLATING FOR ENHANCED DECODING PERFORMANCE filed Dec. 23, 2014 (Meier et al.);

U.S. Patent Application No. 62/095,822 for TABLET COMPUTER WITH INTERFACE CHANNELS filed Dec. 23, 2014 (Bidwell et al.);

U.S. Patent Application No. 62/096,910 for SCANNING IMPROVEMENTS FOR SATURATED SIGNALS USING AUTOMATIC AND FIXED GAIN CONTROL METHODS filed Dec. 26, 2014 (Hejl et al.);

U.S. Patent Application No. 62/096,982 for PRODUCT AND LOCATION MANAGEMENT VIA VOICE RECOGNITION filed Dec. 26, 2014 (Pecorari et al.);

U.S. Patent Application No. 62/097,054 for POWER CONFIGURABLE HEADBAND filed Dec. 27, 2014 (DiPiazza et al.);

U.S. Patent Application No. 62/097,056 for ACCELERATION-BASED MOTION TOLERANCE AND PREDICTIVE DECODING filed Dec. 27, 2014 (Todeschini et al.);

U.S. Patent Application No. 62/097,091 for REMOTE MONITORING OF VEHICLE DIAGNOSTIC INFORMATION filed Dec. 28, 2014 (Carrasco);

U.S. Patent Application No. 62/097,097 for DYNAMIC CHECK DIGIT UTILIZATION VIA ELECTRONIC TAG filed Dec. 28, 2014 (Pecorari et al.;

U.S. Patent Application No. 62/097,356 for SYMBOL BASED LOCATION IDENTIFICATION filed Dec. 29, 2014 (Pecorari et al.);

U.S. Patent Application No. 62/097,367 for INTERLEAVING SURPRISE ACTIVITIES IN WORKFLOW filed Dec. 29, 2014 (Murawski et al.);

U.S. Patent Application No. 62/097,411 for CONFIRMING PRODUCT LOCATION USING A SUBSET OF A PRODUCT IDENTIFIER filed Dec. 29, 2014 (Mellott et al.);

U.S. Patent Application No. 62/097,480 for DISTRIBUTED HEADSET WITH ELECTRONICS MODULE filed Dec. 29, 2014 (DePiazza et al.);

U.S. Patent Application No. 62/097,632 for METHOD OF SIMULATING A VIRTUAL OUT-OF-BOX EXPERIENCE OF A PACKAGED PRODUCT filed Dec. 30, 2014 (Todeschini et al.);

U.S. Patent Application No. 62/098,012 for METHOD AND SYSTEM FOR IMPROVING BARCODE SCANNER PERFORMANCE filed Dec. 30, 2014 (Au et al.);

U.S. Patent Application No. 62/098,072 for REAL-TIME ADJUSTABLE WINDOW FEATURE FOR BARCODE SCANNING AND PROCESS OF SCANNING BARCODE WITH ADJUSTABLE WINDOW FEATURE filed Dec. 30, 2014 (Todeschini et al.);

U.S. Patent Application No. 62/098,110 for Point-of-Sale (POS) Code Sensing Apparatus filed Dec. 30, 2014 (Good et al.);

U.S. Patent Application No. 62/098,150 for Augmented Reality Vision Barcode Scanning System and Method filed Dec. 30, 2014 (Franz);

U.S. Patent Application No. 62/098,174 for System and Method for Detecting Barcode Printing Errors filed Dec. 30, 2014 (Ackley);

U.S. Patent Application No. 62/098,188 for Cargo Apportionment Techniques filed Dec. 30, 2014 (Morton et al.);

U.S. Patent Application No. 62/098,201 for Visual Feedback for Code Readers filed Dec. 30, 2014 (Sailors et al.);

U.S. Patent Application No. 62/098,458 for METHOD OF USER AUTHENTICATION VIA VIRTUAL OBJECT MANIPULATION filed Dec. 31, 2014 (Todeschini);

U.S. Patent Application No. 62/098,540 for SPEED-LIMIT-COMPLIANCE SYSTEM AND METHOD filed Dec. 31, 2014 (Chamberlin);

U.S. Patent Application No. 62/098,643 for INDUSTRIAL VEHICLE POSITIONING SYSTEM AND METHOD filed Dec. 31, 2014 (Chamberlin et al.);

U.S. Patent Application No. 62/098,676 for RECLOSABLE STRAP ASSEMBLY filed Dec. 31, 2014 (Oberpriller et al.);

U.S. Patent Application No. 62/098,708 for SYSTEM AND METHOD FOR MONITORING AN INDUSTRIAL VEHICLE filed Dec. 31, 2014 (Smith);

U.S. Patent Application No. 62/101,156 for MULTIPLE PRIMARY USE INTERFACES filed Jan. 8, 2015 (Pike et al.);

U.S. Patent Application No. 62/101,178 for PORTABLE DIALOGUE ENGINE filed Jan. 8, 2015 (Pike et al.);

U.S. Patent Application No. 62/101,170 for STACK HANDLING USING MULTIPLE PRIMARY USER INTERFACES filed Jan. 8, 2015 (Pike et al.);

U.S. Patent Application No. 62/101,203 for APPLICATION DEVELOPMENT USING MULTIPLE PRIMARY USER INTERFACES filed Jan. 8, 2015 (Zabel et al.);

U.S. Patent Application No. 62/101,216 for VOICE MODE ASSET RETRIEVA filed Jan. 8, 2015 (Zabel et al.);

U.S. Patent Application No. 62/101,221 for FACILITATING WORKFLOW APPLICATION DEVELOPMENT filed Jan. 8, 2015 (Doubleday et al.);

U.S. Patent Application No. 62/101,227 for CHARGER WITH STORAGE ELEMENT filed Jan. 8, 2015 (Miraglia et al.);

U.S. Patent Application No. 62/101,235 for CHARGE LIMIT SELECTION FOR VARIABLE POWER SUPPLY CONFIGURATION filed Jan. 8, 2015 (Haggerty et al.);

U.S. Patent Application No. 62/101,242 for POWER SOURCE PACK DETECTION filed Jan. 8, 2015 (Allen et al.);

U.S. Patent Application No. 62/101,564 for VISUAL GRAPHIC AIDED LOCATION IDENTIFICATION filed Jan. 9, 2015 (Pecorari et al.);

U.S. Patent Application No. 62/101,568 for TAG MOUNTED ELECTRONICS MODULE FOR DISTRIBUTED HEADSET filed Jan. 9, 2015 (Di Piazza et al.);

U.S. Patent Application No. 62/101,673 for RESTOCKING WORKFLOW PRIORITIZATION filed Jan. 9, 2015 (Mellott et al.);

U.S. Patent Application No. 62/150,352 for SYSTEMS AND METHODS FOR IMAGING filed Apr. 21, 2015 (McCloskey et al.);

U.S. Patent Application No. 62/174,875 for SYSTEM FOR CONTROLLING LIGHTING IN AN AUGMENTED REALITY ENVIRONMENT filed Jun. 12, 2015 (Todeschini);

U.S. Patent Application No. 62/181,233 for CUSTOMIZABLE HEADSET filed Jun. 18, 2015 (Vargo et al.); and U.S. Patent Application No. 62/183,385 for GESTURE-CONTROLLED COMPUTER SYSTEM filed Jun. 23, 2015 (Bouchat et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A computer-implemented method for controlling an indicia reader's illumination, the method comprising:
   activating a primary light source to illuminate a primary indicia on an item;
   scanning the item's primary indicia with the first light source to produce primary-indicia information;
   classifying the item based on the primary-indicia information;
   comparing the item's class to classes stored in a memory;
   if the item's class matches at least one of the classes stored in the memory, then activating a secondary ultra-violet (UV) light source to illuminate a secondary indicia; and
   deactivating the secondary UV light source if:
      (i) an exposure risk to the secondary UV light source is detected, or
      (ii) the secondary indicia is scanned with the secondary UV light source to produce secondary-indicia information.

2. The method according to claim 1, wherein the exposure risk comprises the expiration of a time-period.

3. The method according to claim 1, wherein the exposure risk comprises the detection of a particular object in the indicia reader's field of view.

4. The method according to claim 3, wherein the particular object is a human or human body part.

5. The method according to claim 4, wherein the human body part is an eye.

6. The method according to claim 1, wherein the exposure risk comprises the detection of a particular substance in the indicia reader's field of view.

7. The method according to claim 1, wherein the exposure risk comprises the detection of a particular behavior in the indicia reader's field of view.

8. The method according to claim 7, wherein the particular behavior comprises the item leaving the indicia reader's field of view.

9. The method according to claim 1, wherein the indicia reader is a hand-held imaging scanner or fixed-mount imaging scanner.

10. The method according to claim 1, wherein the item is an identification document.

11. The method according to claim 1, wherein the secondary indicia is a security mark to prove the item's authenticity.

12. The method according to claim 1, wherein the secondary indicia is visible when illuminated by the secondary UV light source but is otherwise invisible.

13. The method according to claim 1, wherein the primary light source is a visible light source and the primary indicia is visible under normal lighting conditions.

14. The method according to claim 1, wherein the primary indicia is a barcode.

15. A computer-implemented method for limiting ultra-violet (UV) light exposure from an indicia reader configured to read UV sensitive security marks, the method comprising:
- scanning an item with a primary light source of an indicia reader to obtain indicia information pertaining to the item;
- determining at least in part from the indicia information that the item has one or more UV-sensitive security marks;
- activating a UV light source of the indicia reader to read the UV-sensitive security marks; and
- if a UV exposure risk is detected by the indicia reader, then deactivating the UV light source.

16. The method according to claim 15, wherein the UV exposure risk comprises potential UV exposure of (i) a human body part or (ii) an object/substance that is adversely affected by UV light.

17. The method according to claim 15, wherein the UV exposure risk comprises detecting that the item is no longer visible in the indicia reader's field of view.

18. The method according to claim 15, wherein after the UV light source is activated:
- scanning at least one UV-sensitive security mark, and
- recording the at least one UV-sensitive security mark for further processing.

19. The method according to claim 18, wherein the UV exposure risk comprises an expiration of a time-period in which no security marks have been scanned and recorded.

20. An imaging indicia scanner, comprising:
- a camera for capturing images of a field of view;
- a primary illumination subsystem for illuminating the field of view to enable primary indicia scanning;
- a secondary ultra-violet (UV) illumination subsystem for illuminating the field of view to enable UV-sensitive indicia scanning;
- a memory for storing software and a database, wherein the database comprises information corresponding to items that require UV-sensitive indicia scanning;
- a processor communicatively coupled to the camera, the primary illumination subsystem, the secondary UV illumination subsystem, and the memory, the processor configured by software to:
- activate the primary illumination subsystem and the camera when triggered by a user;
- scan the primary indicia with the primary illumination subsystem to produce primary indicia information;
- compare the primary indicia information to the database;
- activate the secondary UV illumination subsystem if the primary indicia information matches at least a portion of the database; and
- deactivate the secondary UV illumination subsystem after (i) the UV-sensitive indicia have been scanned with the secondary UV illumination subsystem, (ii) an exposure risk to the secondary UV illumination subsystem has been detected, or (iii) a time period, in which no UV-sensitive indicia have been scanned and no exposure risks to the secondary UV illumination subsystem have been detected, has expired.

\* \* \* \* \*